July 12, 1932. H. E. SCOTT 1,867,386
TURNTABLE AND TRUCK APPARATUS
Filed May 2, 1929  2 Sheets-Sheet 1
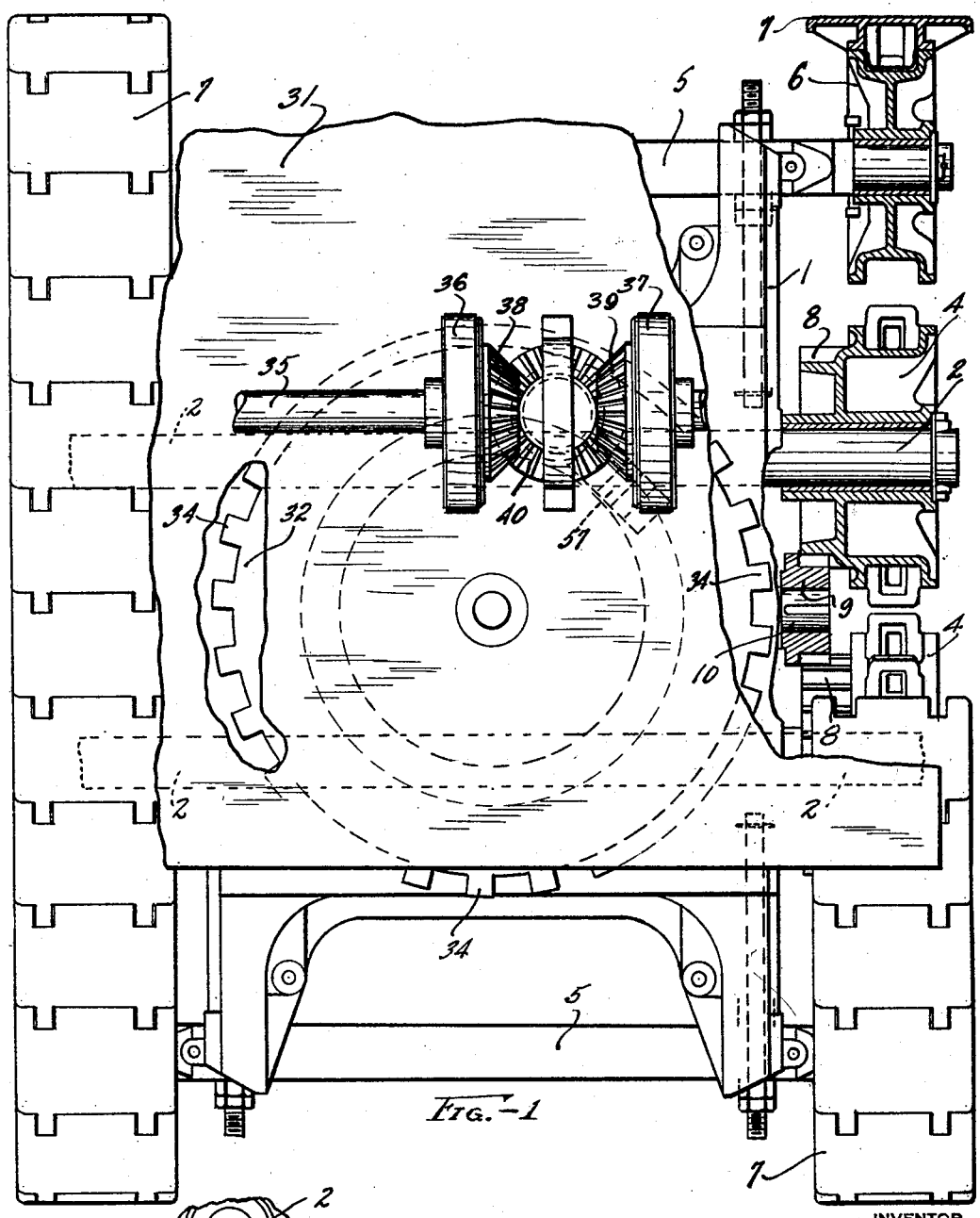
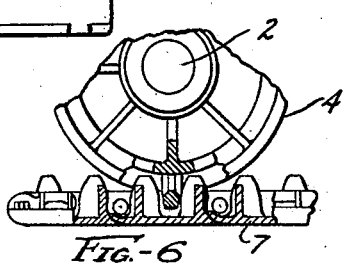
INVENTOR
HARRY E. SCOTT
BY
ATTORNEYS July 12, 1932.  H. E. SCOTT  1,867,386
TURNTABLE AND TRUCK APPARATUS
Filed May 2, 1929  2 Sheets-Sheet 2
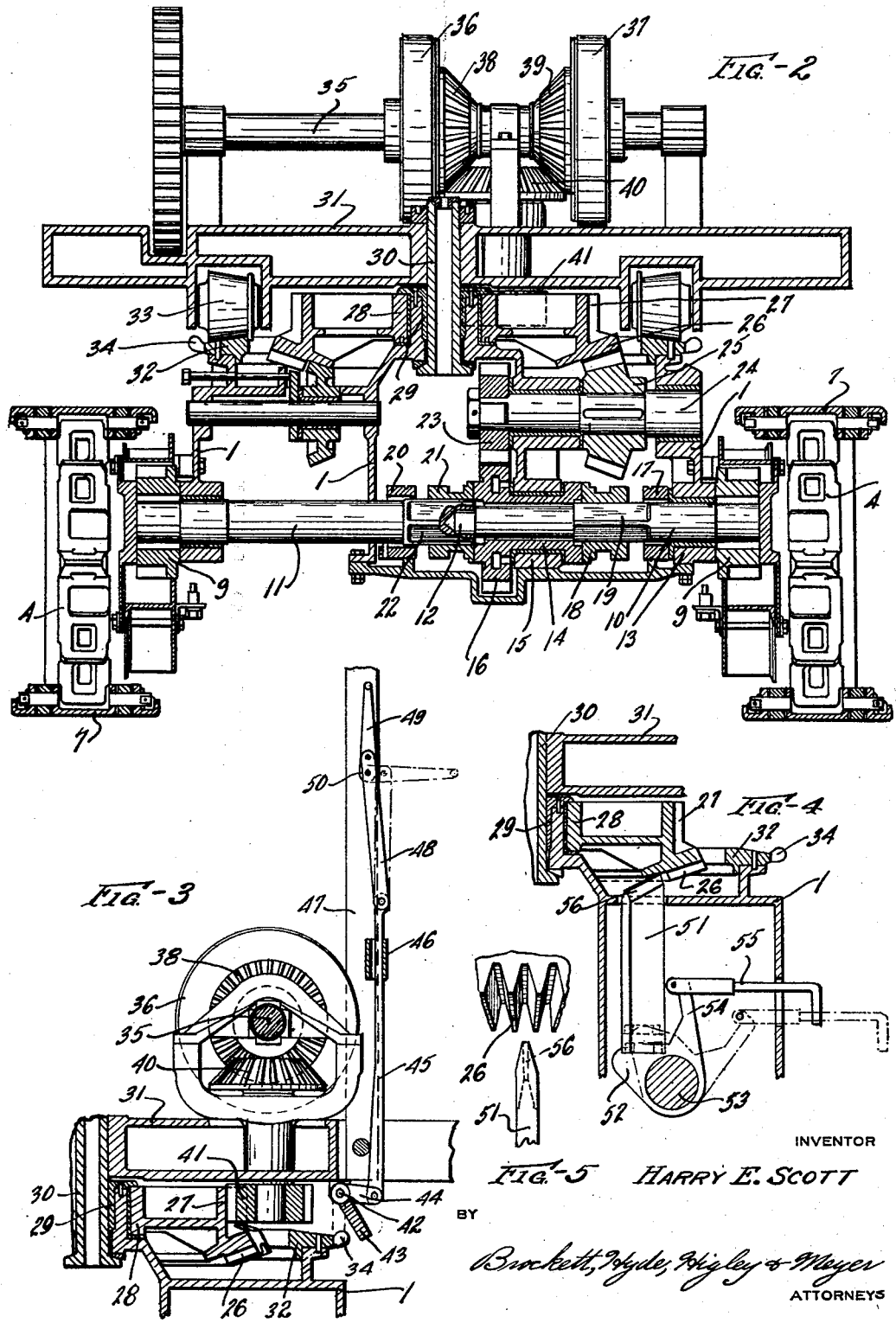
INVENTOR
HARRY E. SCOTT
BY
Brickett, Hyde, Higley & Meyer
ATTORNEYS Patented July 12, 1932

1,867,386

UNITED STATES PATENT OFFICE

HARRY E. SCOTT, OF CLEVELAND HEIGHTS, OHIO, ASSIGNOR TO THE THEW SHOVEL COMPANY, OF LORAIN, OHIO, A CORPORATION OF OHIO

TURNTABLE AND TRUCK APPARATUS

Application filed May 2, 1929. Serial No. 359,856.

The invention forming the subject matter of this application relates to mechanism for use in connection with turn tables and trucks used on power shovels and similar machines.

The object of the present invention is to improve the operative connections between a turn table and preferably a caterpillar type of truck and to provide suitable controls to permit the free manipulation of the turn table on the one hand and the manipulation of the drive of the truck on the other.

The invention is very clearly illustrated in the embodiment set forth in the following description, drawings and claim.

In the drawings, Fig. 1 is a top plan view of the turn table and truck with parts broken away and removed for clarity; Fig. 2 is a sectional view through substantially the center of the apparatus shown in Fig. 1; Fig. 3 is a detail view of the turn table lock and the drive from the driving mechanism on the turn table to the parts below; Fig. 4 is a detail sectional view of the gear lock used when the truck is stationary and the turn table is being revolved; Fig. 5 is another detail view of the gear lock shown in Fig. 4, and Fig. 6 is a detail view showing the cooperation between the sheels and the tread linkages.

In the embodiment shown in the drawings, 1 represents a main frame provided with cross shafts 2, one being provided on each side of the center and arranged transversely of the frame. These two axle shafts 2 extend beyond the sides of the frame 1 and receive driving wheels 4. The frame is also provided with additional transverse shafts 5, one near each end, which are projected beyond the frame and receive tread rollers 6 in alignment with the driving rollers 4. About these drivers and rollers on each side of the machine there is a suitable link-like tread, generally indicated at 7. These treads engage the ground and support the entire structure during standing as well as in movement. Each one of the drivers 4 is provided with a driving gear portion indicated at 8 and the two driving gear portions on each side of the frame meshes with a driving pinion 9. These driving pinions 9 are keyed or otherwise secured to shaft sections 10 and 11, the former being piloted at 12 in the latter 11. The shaft portion 10 is mounted in a bearing 13 in the frame 1 and has a bearing in a double ended clutch and gear member 14 in turn mounted in a bearing 15 in the frame 1. This clutch and gear member has clutch teeth upon both of its end faces and to the left of the bearing 14 is provided with a suitable driven gear 16. Secured to the frame inside of the bearing 13 is a fixed clutch member 17. This clutch member has its clutch teeth spaced from the clutch teeth of the clutch member 14 to provide space for a slidable clutch member 18 upon a squared portion 19 of the shaft section 10. Beyond the opposite end of the clutch and gear member 14 is another fixed clutch member 20 also secured to the frame 1 and it, in like manner, cooperates with a sliding clutch member 21 upon a squared portion 22 of the shaft section 11.

The manipulation of these two sliding clutch members 18 and 21 determines the simultaneous driving of the two shaft sections 10 and 11, depending upon whether both clutch members are in engagement with its fixed clutch member of the pair 17 and 20. When 18, for example, is in engagement with 17 the right hand tread is held stationary and the entire drive is transferred to the left hand tread member. Then the truck will tend to turn about the right hand tread member and therefore tend to steer the entire machine to the left. The mechanism for moving these clutch members is unimportant in this case, but is of any type well known in the art.

Engaging the driven gear 16 is a driving gear 23 mounted on the end of a short shaft 24 mounted in suitable bearings in the frame and carrying a beveled pin 25 in turn meshing with a main gear comprising the beveled gear portion 26 and the spur gear portion 27. This main gear has its hub 28 rotatably mounted upon a vertical central bearing indicated at 29. This bearing is hollow as shown and receives a king pin 30 upon which the turn table 31 is mounted.

The truck is further provided with a turn table trackway 32 adapted to receive upon its upper beveled surface beveled rollers 33 mounted on the underside of the turn table 31. This trackway 32 is circular in form and concentric with the king pin and is provided with a plurality of teeth 34 about its periphery.

Upon the surface of the turn table is an operating shaft 35 adapted for connection through clutches 36 and 37 to beveled gears 38 and 39 respectively. These beveled gears face each other and engage a horizontally disposed beveled gear 40 arranged upon a vertical shaft extending through the turn table and provided at its lower end with a spur driving gear 41 in mesh with the spur gear portion 27 of the main gear.

It will be seen from the foregoing that the pinion 41 when driven has a tendency to drive the main gear and if this main gear be permitted to revolve and the turn table is held against movement, then a drive is transmitted through the gears 25, 23, 16 and the clutches to the treads, but on the other hand, if this gear be held against rotation, and the turntable unlatched from the truck, the turn table may be revolved upon the truck. The invention centers about this locking and unlocking of the main gear and the turn table to permit drive through these parts for moving the apparatus along the ground on the one hand and for rotating the turn table upon the truck on the other.

Mounted at a suitable point, is a latch shaft 42 carrying a swing latch 43 adapted to engage between the teeth 34 of the trackway 32. This latch may be provided with any suitable operating mechanism. In the instance shown it comprises the lever portion 44 connected to a slide 45 passing through a guide 46 secured to a frame part 47. The upper end of this slide is connected to a link 48 in turn connected to an operating lever 49 pivoted at 50 to a stationary part. It will be seen from the foregoing that by the operation of the handle 49 the latch 43 may be moved into and out of engagement with the teeth 34 of the trackway 32, and since the latter is fixed to the truck frame, the turn table member will be locked to the truck and if the main gear is free to rotate, power may be transmitted through it, as above described, to the treads and the vehicle may be propelled along the ground.

In addition to the lock just described, the apparatus is provided with another lock for the main gear and this lock is shown in Figs. 4 and 5. Its general location with respect to the rest of the mechanism is indicated in Fig. 4. Slidably mounted in the frame and movable vertically therein, is a lock bar 51 provided with a recess for receiving a cam 52 mounted upon a shaft 53 supported in suitable bearings in the frame. This cam is provided with an operating arm 54 connected to an operating rod 55 extending out from one end of the frame to a convenient point for operation by one of the operatives. The upper end of this lock bar is provided with a toothed structure 56 similar to a beveled gear tooth and adapted for movement into mesh with the beveled gear teeth of the beveled gear portion 26 of the main gear. This lock bar is located at substantially the point indicated in dotted lines at 57 in Fig. 1. When this lock bar is raised by its cam, its upper toothed end meshes into the beveled gear teeth of the main gear and locks this gear to the truck and if the latch 43 be disengaged from the track teeth 34, the turn table may be revolved upon the truck freely through the instrumentality of the pinion 41 in its mesh with the spur toothed portion 27 of the main gear which then acts as a circular rack about which this pinion 41 may gyrate. From the foregoing, it is obvious that apparatus of the turn table and truck type is provided with means whereby, through a central main member or gear, a drive may be transmitted to the wheels by locking the turn table to the truck and the turn table on the other hand may be rotated upon the truck by locking the main gear to the truck and releasing the turn table from the truck.

I claim:

In a machine of the class described and having a turn table with power means thereon, and a supporting and propelling truck means therefor, said truck means comprising a frame, an associated pair of through axles, wheel carried by said axles, endless tread linkages associated with said wheels, said truck frame having a transverse driving shaft with pinions thereon having driving engagement with said wheels, a ring gear arranged between said turn table and said truck frame, and arranged to be driven by said power means, a jack shaft carried by said truck frame and arranged to be driven by said ring gear, a driving clutch member carried by said truck frame and arranged to be driven from said jack shaft, said transverse shaft being split and having a portion bearing in said clutch member and driven clutch members upon the transverse shaft portions and arranged for optional driven engagement with said driving clutch member.

In testimony whereof I hereby affix my signature.

HARRY E. SCOTT.